US012563598B2

(12) United States Patent
Mysore et al.

(10) Patent No.: US 12,563,598 B2
(45) Date of Patent: Feb. 24, 2026

(54) BLUETOOTH LOW ENERGY BASED WIRELESS AIR-TIME MANAGEMENT SYSTEM

(71) Applicant: Cypress Semiconductor Corporation, San Jose, CA (US)

(72) Inventors: Manamohan Mysore, Ramona, CA (US); Arvind Sridharan, San Diego, CA (US); Victor Zhodzishsky, Potomac, MD (US); Cyrill Krymmer, San Diego, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 287 days.

(21) Appl. No.: 18/511,614

(22) Filed: Nov. 16, 2023

(65) Prior Publication Data

US 2025/0168880 A1     May 22, 2025

(51) Int. Cl.
*H04W 74/0816*     (2024.01)
*H04W 74/04*     (2009.01)
*H04W 74/08*     (2009.01)

(52) U.S. Cl.
CPC ....... *H04W 74/0816* (2013.01); *H04W 74/04* (2013.01); *H04W 74/0875* (2013.01)

(58) Field of Classification Search
CPC ............. H04W 74/0816; H04W 74/04; H04W 74/0875; H04W 74/002; H04W 72/0446; H04W 4/06; H04W 4/80
See application file for complete search history.

(56) References Cited

U.S. PATENT DOCUMENTS

2019/0223125 A1 *  7/2019  Simon ............... H04W 56/0015
2024/0107470 A1 *  3/2024  Yang ..................... H04J 3/0682

* cited by examiner

*Primary Examiner* — Hashim S Bhatti

(57) ABSTRACT

Disclosed are techniques to setup and use a BLE based wireless network between central devices of multiple piconets to exchange information to coordinate air-time usage by the piconets of the central devices. The information exchanged may include channel maps that indicate frequency channels that are available for use by the respective piconets, slot availability masks that indicate future air-time slots for use by the respective piconets based on a common time reference, and other meta information used to coordinate regulation of air-time usage. The multiple central devices may collaboratively regulate their respective air-time usage based on the exchanged information to reduce the potential for air-time clash. In one aspect, the central devices may use the periodic advertising with response (PAwR) protocol in BLE to exchange future air-time usage information. The timing of periodic advertising packets may provide a time reference for the multiple central devices to coordinate their air-time usage.

20 Claims, 7 Drawing Sheets

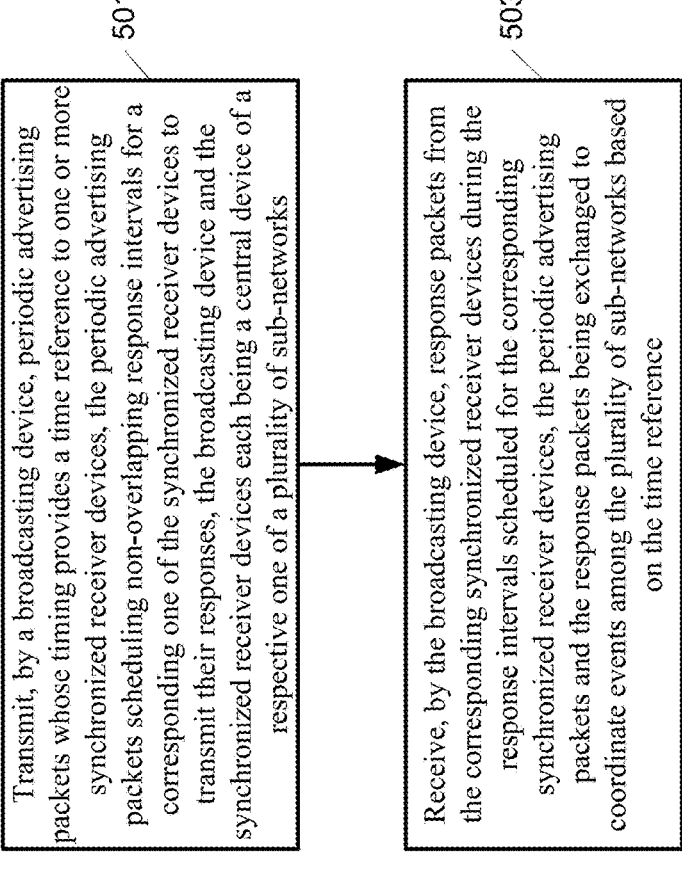

500

501

Transmit, by a broadcasting device, periodic advertising packets whose timing provides a time reference to one or more synchronized receiver devices, the periodic advertising packets scheduling non-overlapping response intervals for a corresponding one of the synchronized receiver devices to transmit their responses, the broadcasting device and the synchronized receiver devices each being a central device of a respective one of a plurality of sub-networks

503

Receive, by the broadcasting device, response packets from the corresponding synchronized receiver devices during the response intervals scheduled for the corresponding synchronized receiver devices, the periodic advertising packets and the response packets being exchanged to coordinate events among the plurality of sub-networks based on the time reference

FIG. 5

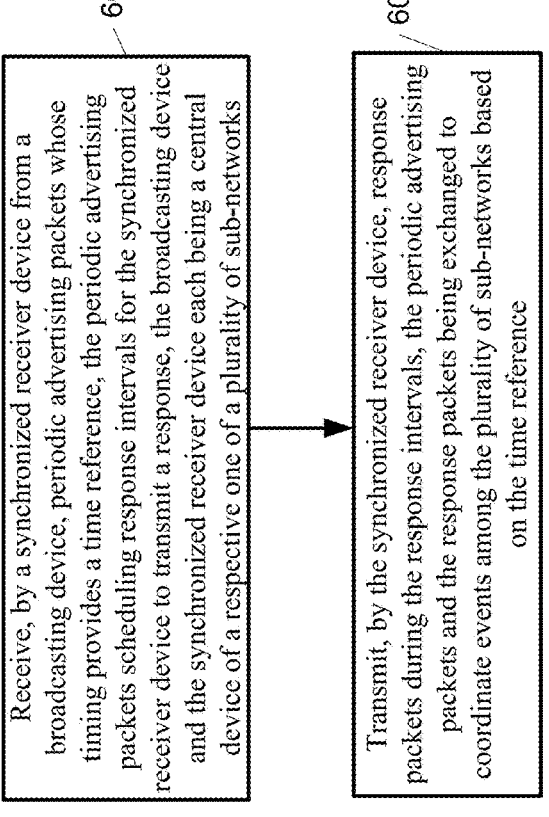

Receive, by a synchronized receiver device from a broadcasting device, periodic advertising packets whose timing provides a time reference, the periodic advertising packets scheduling response intervals for the synchronized receiver device to transmit a response, the broadcasting device and the synchronized receiver device each being a central device of a respective one of a plurality of sub-networks

601

Transmit, by the synchronized receiver device, response packets during the response intervals, the periodic advertising packets and the response packets being exchanged to coordinate events among the plurality of sub-networks based on the time reference

BLUETOOTH LOW ENERGY BASED WIRELESS AIR-TIME MANAGEMENT SYSTEM

TECHNICAL FIELD

This disclosure generally relates to technologies for establishing and using connections between devices using narrow-band radios such as Bluetooth wireless technologies, and more particularly, to methods and systems for multiple central devices of a Bluetooth Classic or Bluetooth Low Energy (LE) network to establish connections to coordinate air-time usage among the central devices or to collaborate in other multi-node applications or agreement-based protocols.

BACKGROUND

In a Bluetooth Classic or Bluetooth LE network, multiple central devices may coexist. Each of the central devices may communicate with its own set of peripherals to form a piconet. Each piconet may consume its own set of air-time resources when the central device or peripherals transmit using one or more frequency channels and time slots. However, transmissions from the multiple piconets may clash in frequency and in time. Such clash of air-time resources may degrade the received signal-to-noise ratio or cause dropped packets, leading to lower performance, higher power consumption due to retransmission, longer latency, and bad user experience. It is desirable to provide a mechanism for central devices of multiple piconets to collectively manage air-time resources to reduce the probability of air-time clash. In other context, the central devices may use the mechanism to collaborate among them to jointly implement an application or to improve the performance of the piconets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 illustrates a flow diagram of a method for a central device assuming the role of the broadcaster of a PAwR based network to exchange future air-time usage information with another central devices assuming the role of the synchronized receiver of the PAwR network in accordance with one aspect of the present disclosure;

FIG. 6 illustrates a flow diagram of a method for a central device assuming the role of the synchronized receiver of a PAwR based network to exchange future air-time usage information with a broadcasting central device of the PAwR based network in accordance with one aspect of the present disclosure;

DETAILED DESCRIPTION

Figure 1:
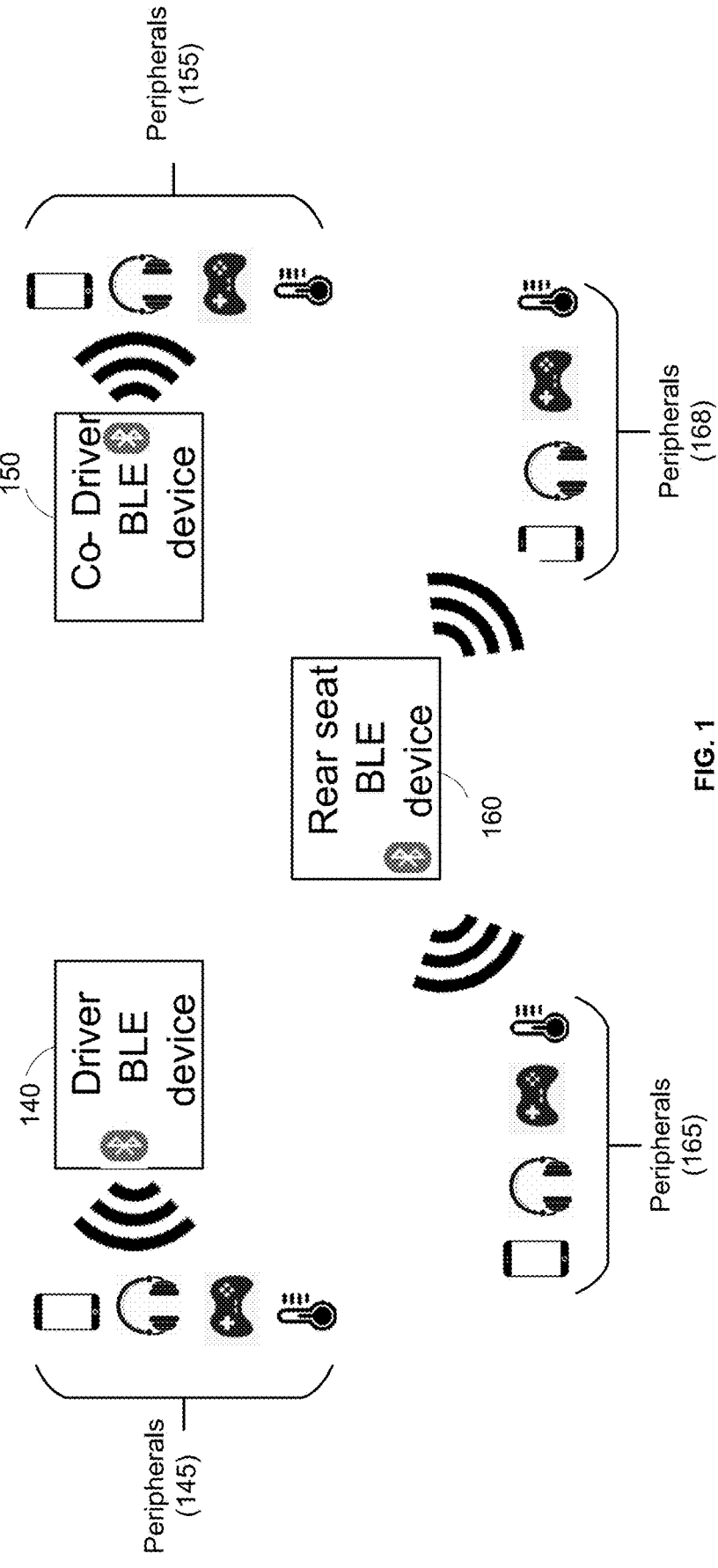
FIG. 1 depicts a scenario of multiple central devices of a BLE network sharing air-time in an automotive application in which each central device communicates with its own set of peripherals to form a piconet in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

In Bluetooth LE (BLE), a central device plays the role of the master to control the timing and channels of communication with one or more connected peripheral devices. For example, the central device may provide a synchronization reference and a frequency hopping pattern for the devices to share the physical radio channel. The peripheral devices may synchronize to the central device's clock and the frequency hopping pattern. The group of devices synchronized in such a fashion may form a wireless communication network called a piconet. A device that wishes to become a peripheral device generally broadcasts advertisements using advertising channels, and a central device that desires to create a connection may initiate a connection to the advertising device. After the pair of devices enter a connection state in the link layer, the central device may time-multiplex communication between the central device and the connected peripheral device with those of other connected peripheral devices. The piconet may cover a small geographic area. In many environments, multiple piconets and their central devices may coexist. The multiple central devices and their piconets may operate independently of one another, creating the potential for transmissions from the piconets to clash in frequency and in time. When air-time clash occurs, collective performance of the piconets suffers as manifested in dropped packets due to signal interference, higher power consumption and increased latency due to retransmissions, etc. It is desirable for the central devices of the multiple piconets to share information with each other regarding their respective air-time usage in terms of planned use of frequency and time resources. The piconets may then coordinate the their transmissions to reduce the probability of air-time clash. Wired communication methods such as cabling between the central devices to exchange information between the piconets are expensive and not readily scalable.

Disclosed are techniques to setup and use a BLE based wireless network between multiple central devices to exchange information to coordinate air-time usage by the multiple piconets associated with the central devices. The information exchanged may include channel maps that indicate frequency channels that are available or preferred for use by the respective piconets, slot availability masks that indicate future air-time slots for use by the respective piconets based on a common time reference, and other meta information used to coordinate regulation of air-time usage. The multiple central devices may collaboratively regulate their respective air-time usage based on the exchanged information to reduce the potential for air-time clash. In another aspect, the multiple central devices may use the BLE based wireless network between them to exchange information to collaborate on other multi-node applications or agreement based protocols. Advantageously, the BLE wireless network is easily scalable, allowing additional central devices and their associated piconets to come online to exchange information with an existing group of central devices to collectively coordinate their air-time usage.

FIG. 1 depicts a scenario of multiple central devices of a BLE network sharing air-time in an automotive application in which each central device communicates with its own set of peripherals to form a piconet in accordance with one aspect of the present disclosure. Three piconets coexist to provide BLE links covering various areas inside the vehicle. A driver side central BLE device 140 may communicate with its set of peripherals 145 to form a driver side piconet. A co-driver side central BLE device 150 may communicate with its set of peripherals 155 to form a co-driver side piconet. A rear seat central BLE device 160 may communicate with two sets of peripherals 165 and 168, one for each passenger in the rear seat to form a rear seat piconet. The peripherals may include human interface devices (HIDs) such as a cell phone, a headphone, a gaming controller, etc., to engage in activities such as Bluetooth Classic or BLE audio sessions, audio streaming, gaming, internet surfing (e.g., via Wi-Fi of a Wi-Fi-Bluetooth combo device), etc. The peripherals may also include automotive sensors such as a tire pressure monitoring system, a battery management system, etc., to provide sensor data to a master control unit of the vehicle. The three piconets operate independently of one another in close proximity and transmissions from the central device or the peripherals (also referred to as a node) of one piconet may interfere with the transmissions from the node of another piconet.

In one embodiment, an air-time management scheme may coordinate the frequency channels, time intervals, and relative timing used by the multiple piconets to minimize air-time clash. If the central devices 140, 150, 160 are connected by wires, a master control unit or a Bluetooth device of the vehicle may receive air-time usage information from the central devices to perform the air-time management function. However, as mentioned, cabling costs are high and a wired communication network is not easily scalable. To overcome the difficulties, a low overhead, modular, BLE based wireless network may connect the central devices 140, 150, 160 for the central devices to collaboratively regulate the air-time usage by the nodes of the respective piconets based on a common time reference.

Figure 2:
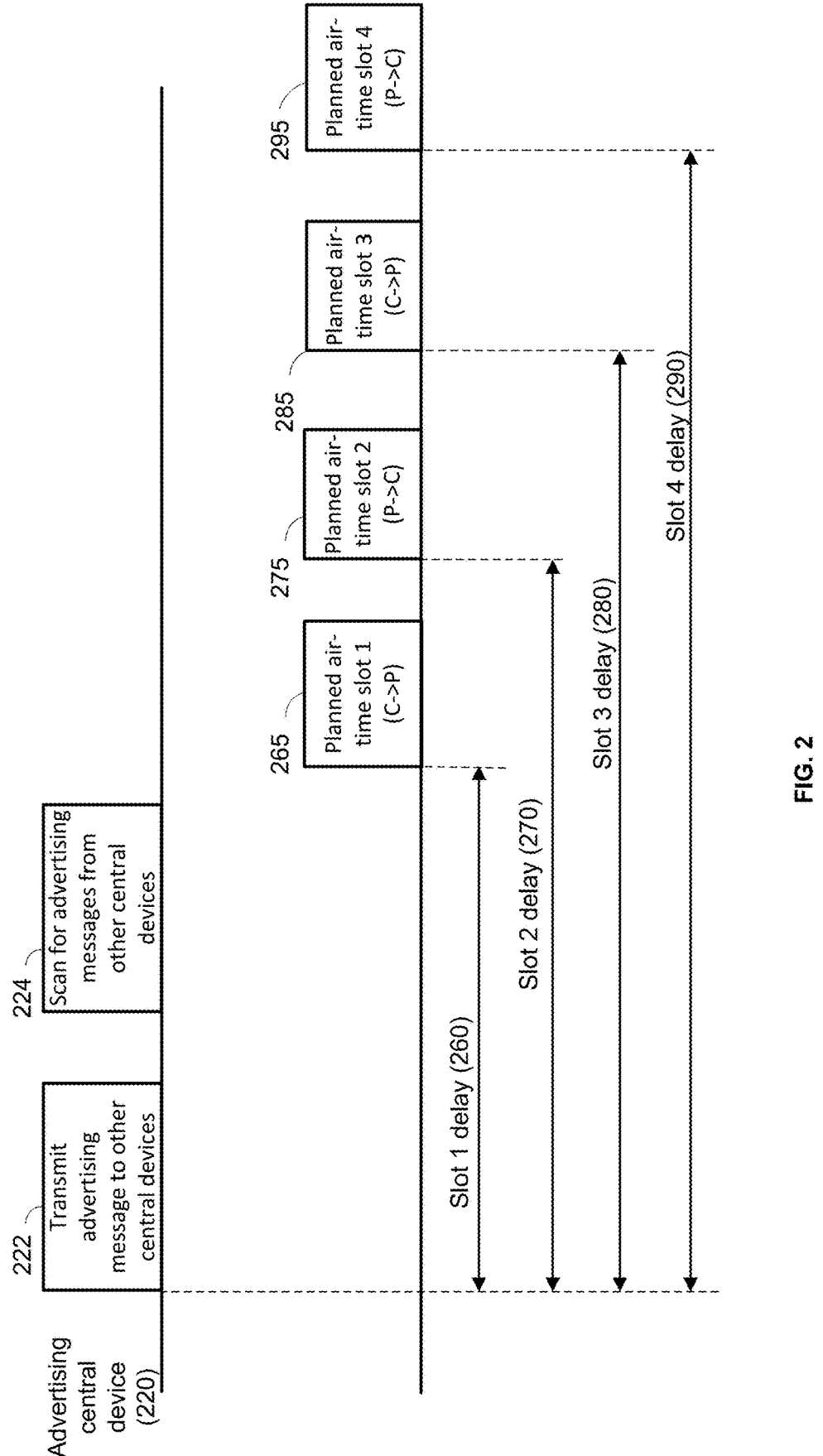
FIG. 2 illustrates a mechanism for using an advertising based mesh network for multiple BLE central devices to exchange future air-time usage information in accordance with one aspect of the present disclosure.

FIG. 2 illustrates a mechanism for using an advertising based mesh network for multiple BLE central devices to exchange future air-time usage information in accordance with one aspect of the present disclosure.

The multiple BLE central devices may form a regular advertising or extended advertising based mesh. All of the BLE central devices may advertise to broadcast its own air-time usage information and may scan to listen to broadcasts from other BLE central devices to receive their air-time usage information. For example, an advertising central device 220 may transmit advertising messages to other central devices at a first time interval 222 and may scan for advertising messages from other central devices at a second time interval 224.

In one embodiment, an advertising message may contain an air-time usage channel map to indicate frequency channels that are available or preferred for use by the nodes of the piconet associated with the advertising central device (e.g., advertising central device 220). The advertising message may also contain a slot map to indicate air-time slots scheduled for use by the nodes of the piconet. The air-time slots may be scheduled relative to the timing of the advertising messages. For example, the advertising central device 220 may schedule a first air-time slot 265 for central-to-peripheral communication at slot 1 delay 260 from the beginning of the first time interval 222 carrying the advertising message. The advertising central device 220 may schedule a second air-time slot 275 for peripheral-to-central communication at slot 2 delay 270, a third air-time slot 285 for central-to-peripheral communication at slot 3 at slot 3 delay 280, and a fourth air-time slot 295 for peripheral-to-central communication at slot 4 delay 290 from the beginning of the first time interval 222.

The advertising central device 220 may receive air-time usage channel maps and slot maps broadcast from other central devices via their advertising messages for the advertising central device 220 to regulate its own air-time usage to reduce or minimize air-time clash. The advertising based mesh network leverages existing advertising protocols and logic running on the hosts of the central devices to exchange air-time usage information. However, because a central device does not know when to expect advertising messages from other peer central devices, the central device may expend significant air-time scanning for broadcasts from the peer central devices. Furthermore, each central device may have its own time reference based on its advertisement transmission, complicating coordination of air-time usage among the central devices. There also may not be native encryption support in common advertising protocols. An alternate network that is more economical in the use of channel bandwidth to exchange air-time usage information among the central devices may be desirable.

Figure 3:
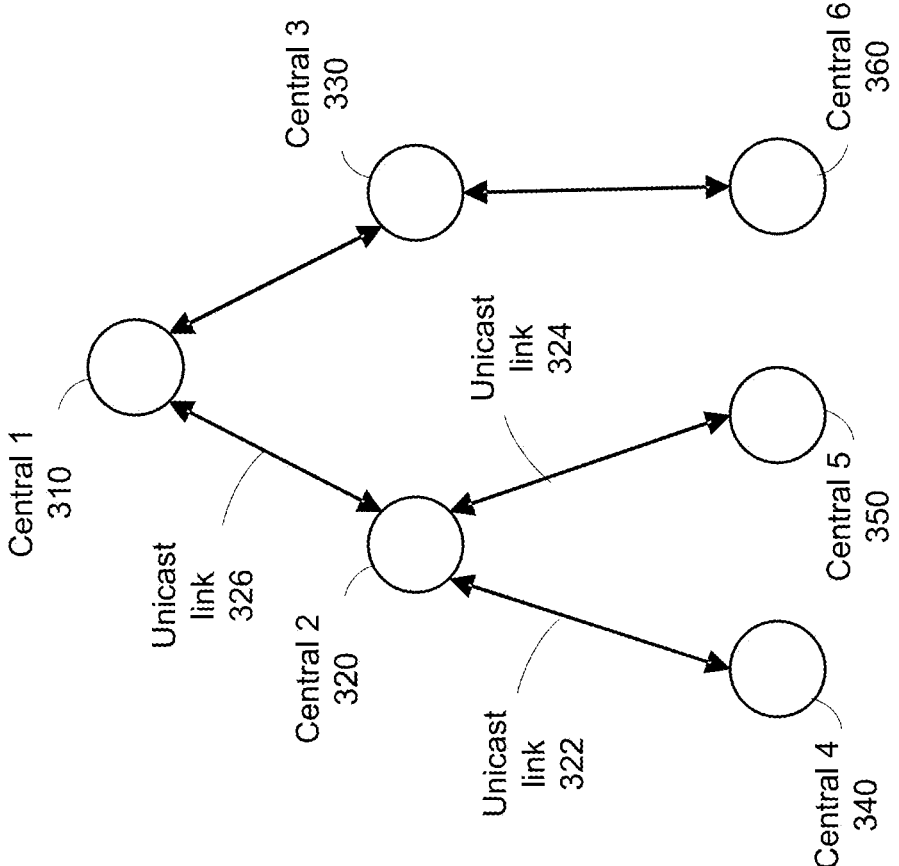
FIG. 3 illustrates using a connected mesh network for multiple BLE central devices to exchange future air-time usage information in accordance with one aspect of the present disclosure.

FIG. 3 illustrates using a connected mesh network for multiple BLE central devices to exchange future air-time usage information in accordance with one aspect of the present disclosure.

The connected mesh network may include multiple unicast links or connections between a pair of BLE central devices for exchanging air-time usage information between the pair. Due to the topology of the connected mesh network, data may be disseminated hop-by-hop. A central device as a node of the connected mesh network may send a summary of the air-time usage information of all known peer central devices. For example, central device 2 (320) may form a unicast link 322 with neighboring central device 4 (340), a unicast link 324 with neighboring central device 5 (350), and a unicast link 326 with neighboring central device 1 (310) to exchange air-time usage information. Central device 2 (320) may disseminate air-time usage information of central device 4 (340) and central device 5 (350) in addition to its own air-time usage information to central device 1 (310) via unicast link 326; central device 2 (320) may disseminate air-time usage information of central device 1 (310) and central device 4 (340) in addition to its own air-time usage information to central device 5 (350) via unicast link 324; and central device 2 (320) may disseminate air-time usage information of central device 1 (310) and central device 5 (350) in addition to its own air-time usage information to central device 4 (340) via unicast link 322. Over time, by propagating through the topology of the connected mesh network, the air-time usage information about every central device may be disseminated to every other central device. In general, for a connected mesh network with N central devices or nodes, there may be N−1 unicast links between the nodes.

In one embodiment, the central devices may exchange timing information through the connected mesh network to synchronize their time so that the slot availability mask or the slot map scheduling the air-time slots from each central device may be expressed relative to a known time reference. Compared to the advertising based mesh network, the connected mesh network is relatively economical in air-time and there may be native support for encryption. However, it may take multiple hops to propagate air-time usage information between distance nodes, increasing latency. Using the unicast links of a connected mesh network to achieve one-to-many and many-to-one communication may also introduce the complexities of a routing algorithm. An alternative network that reduces the latency associated with disseminating air-time usage information among the central devices may be desirable.

Figure 4:
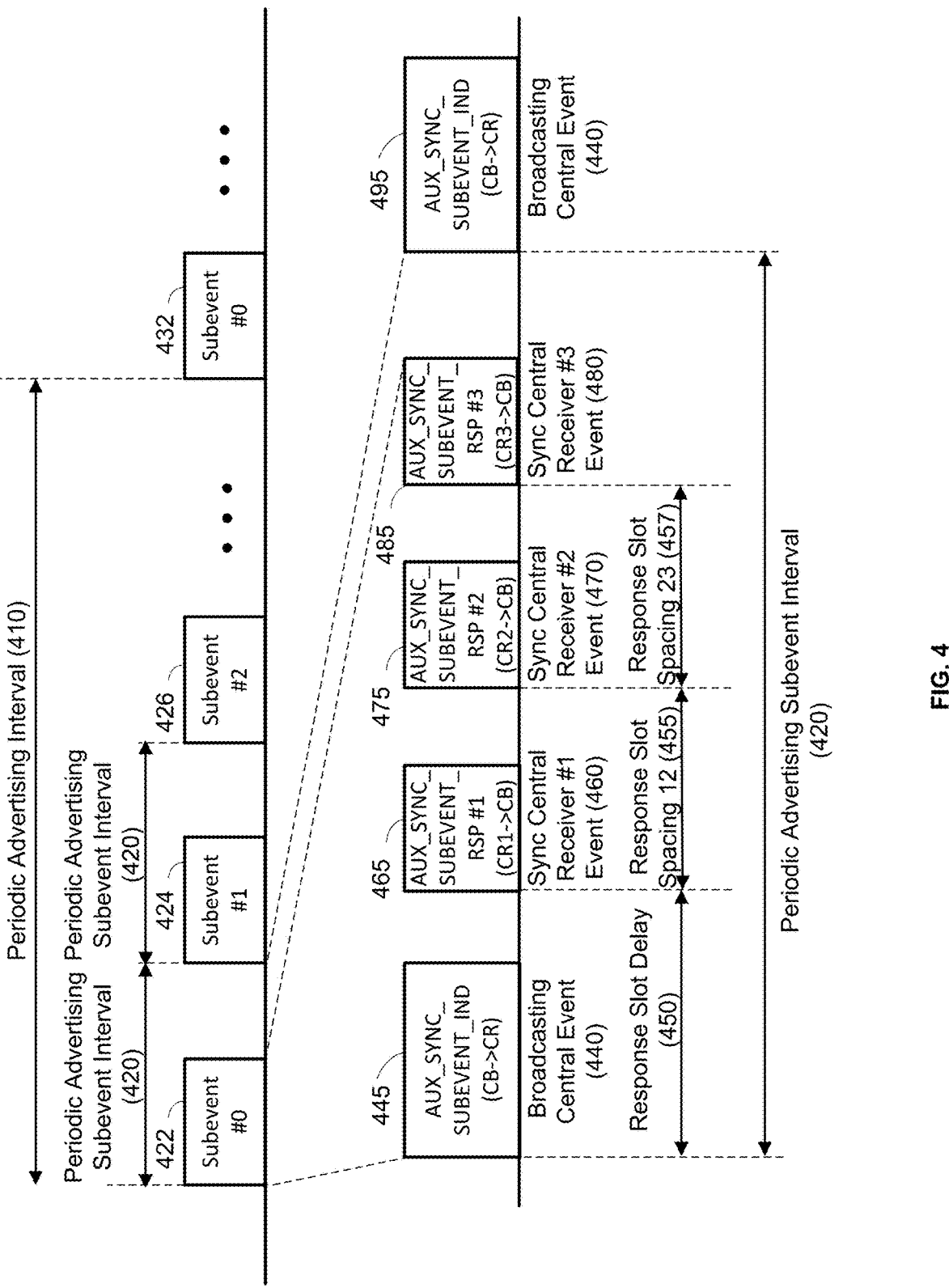
FIG. 4 illustrates a mechanism for using the periodic advertising with response (PAwR) protocol in BLE for multiple central devices to exchange future air-time usage information in accordance with one aspect of the present disclosure.

FIG. 4 illustrates a mechanism for using the periodic advertising with response (PAwR) protocol in BLE for multiple central devices to exchange future air-time usage information in accordance with one aspect of the present disclosure. PAwR protocol is a fixed-interval broadcast-based protocol that supports one-to-many bidirectional communication.

A central device may be chosen as the broadcaster of the PAwR based network. In one embodiment, the central devices may initially exchange their identification information (e.g., BD_ADDR) to select one central device (e.g., one with the largest numerical BD_ADDR) as the broadcaster. In one embodiment, the central devices may pre-designate one of them as the broadcaster. The central device selected as the broadcaster may periodically broadcast messages containing its air-time usage information to other central devices, also referred to as synchronized receiver devices, synchronized receivers, or synchronized devices. The timing of the periodic broadcast transmissions may be used as a time reference to synchronize the air-time among the central devices. The periodic broadcast messages may assign subevents for the synchronized receiver devices to respond with messages containing their air-time usage information. The subevents may be non-overlapping to allow one synchronized receiver device to transmit its response message at a time.

In PAwR, advertising packets are transmitted not just on advertising channels 37, 38, and 39, but also on other channels. For example, extended advertising (ADV_EXT_IND) packets, which are transmit on advertising channels 37, 38, and 39, may point to auxiliary advertising (AUX_ADV_IND) packets, which are transmitted on channels other than 37, 38, and 39. The auxiliary advertising packets may in turn point to periodic advertising packets that are transmitted on other channels to announce the broadcast. FIG. 4 shows that transmission events are divided into periodic advertising intervals 410. A periodic advertising interval 410 may be further divided into periodic advertising subevent intervals 420. Within each periodic advertising subevent interval 420 is a subevent. FIG. 4 depicts subevent #0 (422), subevent #1 (424), subevent #2 (426), etc., corresponding to a number of periodic advertising subevent intervals (420).

A subevent may include a broadcaster-to-receiver advertising broadcast event 440, referred to as an auxiliary synchronized subevent indication 445/495 (AUX_SYNC_SUBEVENT_IND message) at the start of each periodic advertising subevent interval 420, followed by responses from synchronized receiver devices. The broadcasting central device may use the AUX_SYNC_SUBEVENT_IND message to transmit its air-time usage information to the synchronized receiver devices. Peer central devices may synchronize their timing to the broadcaster based on the broadcaster-to-receiver broadcast event 440, which may call out which synchronized receiver devices are to respond during scheduled response intervals. After a configured response slot delay 450 measured from the start of the periodic advertising subevent interval 420, a first synchronized receiver device may transmit to the broadcasting central device an auxiliary synchronized subevent response 465 (AUX_SYNC_SUBEVENT_RSP #1 message) representing a receiver-to-broadcaster transmission (a synchronized receiver #1 event 460) from the first synchronized receiver device. The AUX_SYNC_SUBEVENT_RSP #1 message may contain air-time usage information of the first synchronized receiver device.

Responses from synchronized receiver devices within a subevent may be separated by a configured response slot spacing. For example, the auxiliary synchronized subevent response 465 from the first synchronized receiver device and the auxiliary synchronized subevent response 475 (AUX_SYNC_SUBEVENT_RSP #2 message) representing a second receiver-to-broadcaster transmission (a synchronized receiver #2 event 470) from a second synchronized receiver device may be separated by a response slot spacing 12 (455). The AUX_SYNC_SUBEVENT_RSP #2 message may contain air-time usage information of the second synchronized receiver device. The auxiliary synchronized subevent response 475 from the second synchronized receiver device and the auxiliary synchronized subevent response 485 (AUX_SYNC_SUBEVENT_RSP #3 message) representing a third receiver-to-broadcaster transmission (a synchronized receiver #3 event 480) from a third synchronized receiver device may be separated by a response slot spacing 23 (457). The AUX_SYNC_SUBEVENT_RSP #3 message may contain air-time usage information of the third synchronized receiver device.

In one embodiment, the subevent interval 420 is configured in increments of 1.25 ms. In addition, the response slot delay 450 is configured in increments of 1.25 ms, the response slot spacing is configured in increments of 0.125 ms, and the gap (e.g., inter-frame spacing time or T_IFS) between any two adjacent packets in the PAwR train of broadcast events 440 and responses from the synchronized receiver devices are separated by at least 0.150 ms. The periodic advertising interval 410 and the periodic advertising subevent interval 420 may be configured to be long enough so that the broadcast events 440 and the responses from the synchronized receiver devices consume limited bandwidth. For example, in an example of 1 broadcaster and 2 synchronized receiver devices, the periodic advertising interval 410 may be configured to be 2 second, the periodic advertising subevent interval 420 may be configured to be 1 second with 2 subevents in each advertising interval 410, the response slot delay 450 may be configured to be 5 ms, and the response slot spacing may be configured to be 1.25 ms with 2 response slots per each subevent.

In one embodiment, the central devices may synchronize their slot availability masks or slot maps based on a time-stamp calculated using a*PAwR_Event_Counter+b, where PAwR_Event_Counter counts the number of periodic advertising intervals (410) and a and b may be configurable parameters or constants set by the broadcasting central device. In one embodiment, air-time usage information may be encapsulated in a custom header field of the broadcast messages or the response messages. In one embodiment, air-time usage information may be encapsulated in the data field of the broadcast messages or the response messages.

There are multiple techniques for the central devices to exchange air-time usage information and to coordinate their air-time usage based on the exchanged information. In one embodiment, the broadcaster may collect air-time usage information from all synchronized receiver devices to broadcast using the AUX_SYNC_SUBEVENT_IND message. For example, the broadcasting central device may transmit the latest air-time usage information collected from all synchronized receiver devices via the response messages received from pervious advertising subevent intervals 420 to broadcast on the AUX_SYNC_SUBEVENT_IND message of a current advertising subevent interval 420. In this embodiment, there may be higher air-time usage for transmission by the broadcasting central device but lower air-time usage by the synchronized receiver devices. The AUX_SYNC_SUBEVENT_IND message may also be larger to accommodate the increased volume of information.

In one embodiment, a synchronized receiver device may listen to PAwR broadcasts from the broadcasting central device and also listen to response messages from other synchronized receiver devices to obtain air-time usage information of the other synchronized receiver devices in addition to the air-time usage information of the broadcasting central device. For example, in FIG. 4, the first synchronized receiver device may listen during synchronized receiver #2 event 470 to receive AUX_SYNC_SUBEVENT_RSP #2 message that contains air-time usage information of the second synchronized receiver device. Similarly, the first synchronized receiver device may listen during synchronized receiver #3 event 480 to receive AUX_SYNC_SUB-EVENT_RSP #3 message that contains air-time usage information of the third synchronized receiver device.

In contrast to the previous embodiment, the broadcasting central device and the synchronized receiver devices may have similar air-time usage, although the synchronized receiver devices may incur higher power consumption due to the receiver having to operate for longer intervals to receive response messages from other peer devices. The advantage is that a synchronized receiver device may receive the air-time usage information from the other synchronized receiver devices faster, reducing the information latency. The synchronized receiver device may thus more quickly regulate its air-time usage based on the latest air-time usage information from the other synchronized receiver devices to reduce the probability of air-time usage clash.

In one embodiment, the synchronized receiver device may determine the received signal strength indicator (RSSI) associated with the response messages received from the other synchronized receiver devices and the broadcast event received from the broadcasting central device. The synchronized receiver device may report the RSSI information to the broadcasting central device. In one embodiment, the broadcasting central device may determine the RSSI associated with the response messages received from the synchronized receiver devices. The broadcasting central device may use the RSSI information to form groups of synchronized receiver devices that share similar behaviors or characteristics. In one embodiment, any central device may use the RSSI information to deduce the proximity of other central devices so that piconets associated with central devices that are further apart may clash in their air-time usage without suffering a significant degradation in performance.

In one embodiment, the broadcasting central device may use the broadcast events 440 to assign a priority to each synchronized receiver device based on their air-time usage information. A first synchronized receiver device assigned with a lower priority and having scheduled transmission activities from the associated piconet that conflict in time or frequency with scheduled transmission activities from the piconet associated with a second synchronized receiver device assigned with a higher priority may defer to the second synchronized receiver device. The first synchronized receiver device may rearrange or move the scheduled transmission activities of nodes of its associated piconet to new time slots or new frequency channels to avoid the air-time clash. In one embodiment, the broadcasting central device may use the broadcast events 440 to assign a priority to each transmission activity. A first synchronized receiver device whose scheduled transmission activity from the associated piconet has a lower priority that conflicts in time or frequency with a scheduled transmission activity with a higher priority from the piconet associated with a second synchronized receiver device may defer to the second synchronized receiver device. Again, the first synchronized receiver device may rearrange or move the scheduled transmission activity of nodes of its associated piconet to new time slots or new frequency channels to avoid the air-time clash.

In one embodiment, each central device may self-regulate their channel maps that determines which frequency channels are available or preferred for use by the piconet of the central device based on the channel maps of the other central devices. All central devices may report their channel maps. The central devices may adjust their channel maps in a distributed manner to reduce the probability of clash in the frequency channels planned for air-time usage. In one embodiment, a new central device that wishes to coexist with the existing central devices may determine a channel map that does not collide with the existing channel maps.

In one embodiment, each central device may conduct a channel assessment to determine which frequency channels it considers to be "good" channels. The synchronized receiver devices may report their good channels as part of the channel maps to the broadcasting central device. The broadcasting central device may allocate non-overlapping or largely non-overlapping channels to the synchronized receiver devices based on the received channel maps. The broadcasting central device may broadcast the allocated channels as modified channel maps to the synchronized receiver devices. The synchronized receiver devices may use the frequency channels allocated in the centralized manner by the broadcasting central device to reduce the probability of clash in the frequency channels.

In one embodiment, the broadcasting central device may analyze channel usage in the time-domain for the synchronized receiver devices when it allocates channel maps to the synchronized receiver devices. For example, if the broadcasting central device knows the activities associated with each synchronized receiver device and the channel maps used in each synchronized receiver device, the broadcasting central device may determine that some activities are non-overlapping in time. The broadcasting central device may allow the use of overlapping channel maps between synchronized receiver devices when transmissions from these devices do not collide in time.

Advantageously, using the PAwR based network to exchange air-time usage information between central devices is air-time efficient, is scalable to accommodate an ever-increasing number of co-existing central devices, has low information latency, and incurs low power, although there may not be native encryption support. In one embodiment, the PAwR based network may be used as part of a multi-level mesh where the parent and children nodes on adjacent levels may use the PAwR based network to exchange information.

FIG. 5 illustrates a flow diagram of a method 500 for a central device assuming the role of the broadcaster of a PAwR based network to exchange future air-time usage information with another central devices assuming the role of the synchronized receiver device of the PAwR network in accordance with one aspect of the present disclosure. In one aspect, the method 500 may be performed by the host and the controller of a BLE system utilizing hardware, software, or combinations of hardware and software.

In operation 501, a broadcasting device transmits periodic advertising packets whose timing provide a time reference to one or more synchronized receiver devices. The periodic advertising packets schedule non-overlapping response intervals for a corresponding one of the synchronized receiver devices to transmit their responses. Each of the broadcasting device and the synchronized receiver devices is a central device of a respective sub-network.

In operation 503, the broadcasting device receives response packets from the corresponding synchronized receiver devices during the response intervals scheduled for the corresponding synchronized receiver devices. The periodic advertising packets and the response packets are exchanged to coordinate events among the sub-networks based on the time reference.

FIG. 6 illustrates a flow diagram of a method 600 for a central device assuming the role of the synchronized receiver device of a PAwR based network to exchange future air-time usage information with a broadcasting central device of the PAwR based network in accordance with one aspect of the present disclosure.

In operation 601, a synchronized receiver device receives from a broadcasting device periodic advertising packets whose timing provides a time reference. The periodic advertising packets schedule response intervals for the synchronized receiver device to transmit a response. Each of the broadcasting device and the synchronized receiver devices is a central device of a respective sub-network.

In operation 603, the synchronized receiver device transmits response packets during the response intervals. The periodic advertising packets and the response packets are exchanged to coordinate events among the sub-networks based on the time reference.

Various embodiments of the techniques for central devices of multiple piconets to use BLE based wireless network to exchange information to coordinate air-time usage among the piconets associated with the central devices described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device including an antenna, a radio frequency (RF) transceiver, a controller operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

Figure 7:
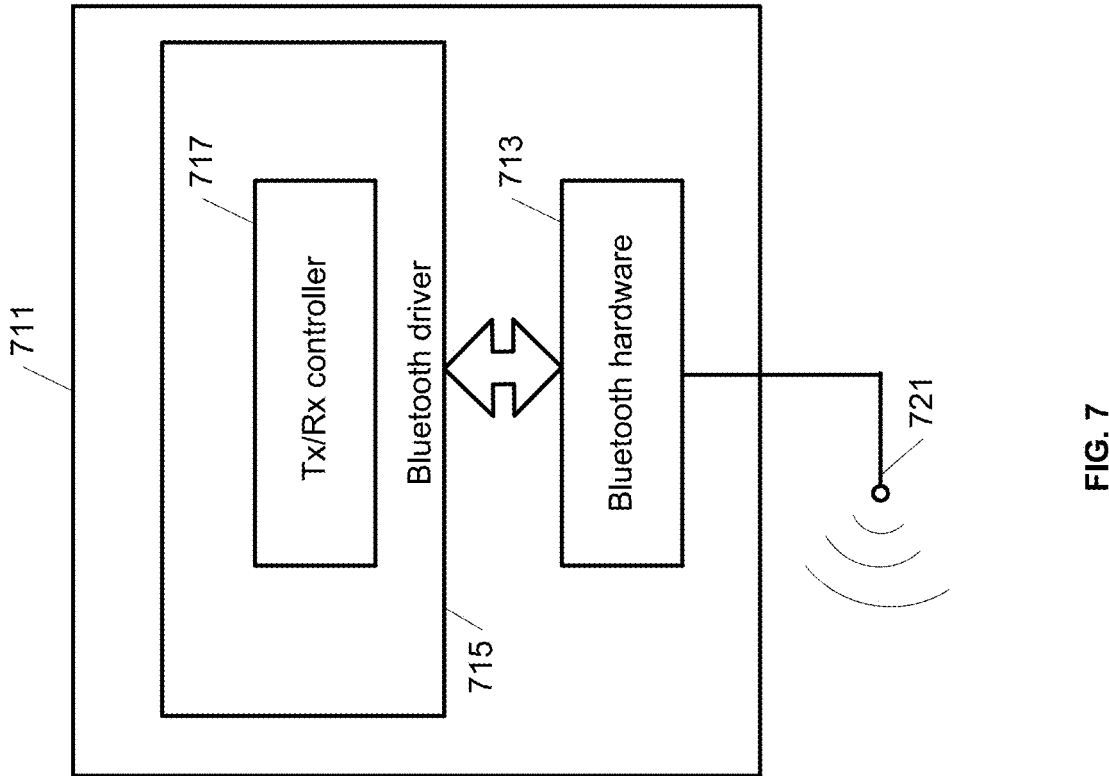
FIG. 7 depicts a block diagram of a Bluetooth device 711 showing hardware and software drivers deployed to operate a BLE link to communicate with another BLE receiver of a central device to exchange air-time usage information in accordance with one aspect of the present disclosure.

FIG. 7 is a block diagram of a Bluetooth device 711 showing hardware and software drivers deployed to operate in a BLE link for connecting with other devices in accordance with one aspect of the present disclosure. The Bluetooth device 711 may practice the network protocol of FIGS. 2-4 or the operations of FIGS. 5-6.

The Bluetooth device 711 may include one or more antennas 721, Bluetooth hardware 713 and Bluetooth driver 715. The Bluetooth driver 715 may include Bluetooth Tx/RX controller 717. The Bluetooth hardware 713 may include a RF transceiver configured to transmit or receive broadcast packets or response packets on an operating channel through the antennas 721. The Bluetooth Tx/RX controller 717 may be configured to generate broadcast packets of the Bluetooth device 711 or decode response packets of other Bluetooth devices to coordinate air-time usage between the Bluetooth device 711 and another device as described herein.

In one embodiment, the Bluetooth device 711 may include a memory and a processing device (e.g., Bluetooth Tx/RX controller 717). The memory may be synchronous dynamic random access memory (DRAM), read-only memory (ROM)), or other types of memory, which may be configured to store the code to perform the function of the Bluetooth driver 715. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for communication between devices of a communication network, comprising:

transmitting, by a broadcasting device, periodic advertising packets whose timing provides a time reference to one or more synchronized devices, the periodic advertising packets scheduling non-overlapping response intervals for a corresponding one of the synchronized devices to transmit their responses, the broadcasting device and the synchronized devices each being a central device of a respective one of a plurality of sub-networks; and receiving, by the broadcasting device, response packets from the corresponding synchronized devices during the response intervals scheduled for the corresponding synchronized devices, the periodic advertising packets and the response packets being exchanged to coordinate events among the plurality of sub-networks based on the time reference.

2. The method of claim 1, wherein the periodic advertising packets and the response packets are exchanged between the broadcasting device and the synchronized devices to coordinate air-time resources used for future transmissions from nodes of the plurality of sub-networks based on the time reference.

3. The method of claim 2, wherein the periodic advertising packets comprise information on time intervals and frequency channels planned for use by transmissions from the sub-network of the broadcasting device and wherein the response packets from the synchronized devices comprise information on time intervals and frequency channels planned for used by transmissions from the respective sub-networks of the synchronized devices.

4. The method of claim 2, wherein the response packets from the synchronized devices comprise candidate frequency channels available for transmission use by the respective sub-networks of the synchronized devices, and wherein the method further comprises:

determining, by the broadcasting device, allocated frequency channels for the sub-networks of the synchronized devices based on the candidate frequency channels for the respective sub-networks; and transmitting, by the broadcasting device, the allocated frequency channels in the periodic advertising packets, wherein the allocated frequency channels for the sub-networks of the synchronized devices are used for transmissions by nodes of the respective sub-networks.

5. The method of claim 1, wherein the advertising packets transmitted from the broadcasting device for a current period comprise information from the synchronized devices received via the response packets from an earlier period.

6. The method of claim 1, wherein the advertising packets transmitted from the broadcasting device comprise a priority assigned to each of the sub-networks associated with the broadcasting device or the synchronized devices, wherein the priority assigned to a corresponding sub-network determines a priority of transmissions from nodes of the sub-network in relation to transmissions from nodes of other sub-networks.

7. The method of claim 1, wherein the periodic advertising packets transmitted from the broadcasting device comprise a priority assigned to each of a plurality of activities, wherein the priority assigned to an activity determines a priority of transmissions of the activity from the plurality of sub-networks relative to other activities from the plurality of sub-networks.

8. The method of claim 1, further comprising:

receiving, by a central device of one of the sub-networks, identification information associated with the central devices of others of the plurality of sub-networks; and selecting, by said central device, itself as the broadcasting device based on the identification information associated with the central devices of others of the plurality of sub-networks and identification information associated with said central device.

9. The method of claim 1, wherein the response intervals for the synchronized devices are scheduled relative to the periodic advertising packets.

10. The method of claim 1, wherein the communication network comprises a Bluetooth Low Energy (BLE) wireless network, and wherein the periodic advertising packets and the response packets comprise a periodic advertising with response (PAwR) protocol.

11. A method for communication between devices of a communication network, comprising:

receiving, by a synchronized device from a broadcasting device, periodic advertising packets whose timing provides a time reference, the periodic advertising packets scheduling response intervals for the synchronized device to transmit a response, the broadcasting device and the synchronized device each being a central device of a respective one of a plurality of sub-networks; and transmitting, by the synchronized device, response packets during the response intervals, the periodic advertising packets and the response packets being exchanged to coordinate events among the plurality of sub-networks based on the time reference.

12. The method of claim 11, wherein the periodic advertising packets comprise information on time intervals and frequency channels planned for use by transmissions from the sub-network of the broadcasting device, and wherein the response packets comprise information on time intervals and frequency channels planned for use by transmissions from the sub-network of the synchronized device.

13. The method of claim 12, further comprising:

determining, by the synchronized device, air-time resources used for transmissions from nodes of the sub-network of the synchronized device based on the time intervals and frequency channels planned for use by transmissions from the sub-network of the broadcasting device, the time intervals and frequency channels planned for use by transmissions from the sub-network of the synchronized device, and the time reference.

14. The method of claim 12, wherein the response packets comprise candidate frequency channels available for transmission use by the sub-network of the synchronized device, and the periodic advertising packets comprise allocated frequency channels selected from the candidate frequency channels, wherein the allocated frequency channels are used for transmissions by nodes of the sub-network of the synchronized device.

15. The method of claim 12, wherein the periodic advertising packets schedule response intervals for a second synchronized device of another sub-network to transmit response packets that include information on time intervals and frequency channels planned for use by transmissions from the sub-network of the second synchronized device, wherein the response intervals for the synchronized device and for the second synchronized device are non-overlapping.

16. The method of claim 15, wherein the periodic advertising packets comprise information on time intervals and frequency channels planned for use by transmissions from the sub-network of the second synchronized device, and wherein the method further comprises:

determining, by the synchronized device, air-time resources used for transmissions from nodes of the sub-network of the synchronized device based on the time intervals and frequency channels planned for use by transmissions from the sub-network of the broadcasting device, the time intervals and frequency channels planned for use by transmissions from the sub-network of the synchronized device, the time intervals and frequency channels planned for use by transmissions from the sub-network of the second synchronized device, and the time reference.

17. The method of claim 15, further comprising:

receiving, by the synchronized device during the response intervals for the second synchronized device, information on time intervals and frequency channels planned for use by transmissions from the sub-network of the second synchronized device, and wherein the method further comprises:

determining, by the synchronized device, air-time resources used for transmissions from nodes of the sub-network of the synchronized device based on the time intervals and frequency channels planned for use by transmissions from the sub-network of the broadcasting device, the time intervals and frequency channels planned for use by transmissions from the sub-network of the synchronized device, the time intervals and frequency channels planned for use by transmissions from the sub-network of the second synchronized device, and the time reference.

18. The method of claim 12, wherein the advertising packets comprise a priority assigned to the synchronized device, the broadcasting device, and any other synchronized device, wherein the priority assigned to the synchronized device determines a priority of transmissions from nodes of the sub-network of the synchronized device in relation to transmissions from nodes of the sub-networks of the broadcasting device and the other synchronized device.

19. The method of claim 12, wherein the advertising packets comprise a priority assigned to each of a plurality of activities, wherein the priority assigned to an activity determines a priority of transmissions of the activity from the plurality of sub-networks relative to other activities from the plurality of sub-networks.

20. An apparatus comprising:

a transceiver configured to:

receive from a broadcasting device, periodic advertising packets, the broadcasting device and the apparatus each being a central device of a respective one of a plurality of sub-networks; and transmit response packets during scheduled response intervals; and a processing system configured to:

determine a time reference from timing of the periodic advertising packets;

determine the scheduled response intervals based on information in the periodic advertising packets and the time reference; and determine information in the response packets, the information in the response packets and the information in the periodic advertising packets being used to coordinate events between the sub-network of the apparatus and the sub-network of the broadcasting device.

* * * * *